(12) United States Patent
Guglielmin

(10) Patent No.: US 12,503,963 B2
(45) Date of Patent: Dec. 23, 2025

(54) NON-LINEAR STIFFNESS BRACKET OF GAS TURBINE ENGINE

(71) Applicant: Pratt & Whitney Canada Corp., Longueuil (CA)

(72) Inventor: Nicholas Guglielmin, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/644,684

(22) Filed: Apr. 24, 2024

(65) Prior Publication Data

US 2025/0334059 A1 Oct. 30, 2025

(51) Int. Cl.
| F01D 25/28 | (2006.01) |
| F01D 25/24 | (2006.01) |
| F02C 7/20 | (2006.01) |
| F02C 7/232 | (2006.01) |
| F02C 7/32 | (2006.01) |
| F15B 21/00 | (2006.01) |
| F23R 3/28 | (2006.01) |

(52) U.S. Cl.
CPC .......... *F01D 25/28* (2013.01); *F01D 25/243* (2013.01); *F02C 7/20* (2013.01); *F02C 7/232* (2013.01); *F02C 7/32* (2013.01); *F15B 21/00* (2013.01); *F05D 2260/38* (2013.01); *F05D 2260/57* (2013.01); *F23R 3/283* (2013.01)

(58) Field of Classification Search
CPC .......... F01D 25/28; F01D 25/243; F02C 7/20; F02C 7/232; F02C 7/32; F15B 21/00; F05D 2260/38; F05D 2260/57; F23R 3/283

See application file for complete search history.

(56) References Cited

U.S. PATENT DOCUMENTS

| 3,678,691 | A | * | 7/1972 | Shohet | F02K 3/075 60/226.3 |
| 3,710,568 | A | * | 1/1973 | Rice | F02C 7/32 60/796 |
| 5,233,512 | A | * | 8/1993 | Gutz | G05B 9/02 318/563 |
| 7,850,419 | B2 | * | 12/2010 | Vrljes | F02C 6/08 415/151 |

(Continued)

FOREIGN PATENT DOCUMENTS

| CN | 204610029 U | 9/2015 |
| GB | 2519551 A | 4/2015 |

OTHER PUBLICATIONS

Extended European Search Report for EP Application No. 25172406. 8, dated Sep. 29, 2025, pp. 1-9.

*Primary Examiner* — Gerald L Sung
*Assistant Examiner* — Rene D Ford
(74) *Attorney, Agent, or Firm* — CANTOR COLBURN LLP

(57) ABSTRACT

A mounting bracket of a gas turbine engine includes a first mounting flange configured to connect the mounting bracket to a casing of the gas turbine engine, a second mounting flange configured to connect a component to the mounting bracket, and a bracket leg extending between the first mounting flange and the second mounting flange. The mounting bracket has a first stiffness when a load is applied in a first force direction and has a second stiffness different from the first stiffness when the load is applied in a second force direction opposite the first force direction.

15 Claims, 6 Drawing Sheets

(56) References Cited

U.S. PATENT DOCUMENTS

| | | |
|---|---|---|
| 9,587,507 B2 * | 3/2017 | Ottow ................. F04D 29/4206 |
| 10,072,684 B2 | 9/2018 | Grip et al. |
| 10,220,950 B2 | 3/2019 | Zheng et al. |
| 10,494,111 B2 | 12/2019 | Bozon et al. |
| 10,823,002 B2 | 11/2020 | Ganiger et al. |
| 11,486,271 B1 * | 11/2022 | Gajowniczek ............ F02C 7/32 |
| 2013/0322985 A1 | 12/2013 | Gasmen et al. |
| 2018/0010524 A1 | 1/2018 | Peace et al. |
| 2019/0033675 A1 | 1/2019 | Umezaki |
| 2020/0300126 A1 | 9/2020 | Peace et al. |
| 2024/0060450 A1 * | 2/2024 | Francis ................. F01D 25/243 |

* cited by examiner

NON-LINEAR STIFFNESS BRACKET OF GAS TURBINE ENGINE

BACKGROUND

Exemplary embodiments of the present disclosure pertain to the art of gas turbine engines.

Gas turbine engines are configured to operate across a wide range of operating conditions, such as speeds, loads, pressures, etc., also referred to as an "operating envelope". To adapt to these changing operating conditions, many gas turbine engines utilize various actuators to manage fuel systems and other systems of the engine. The actuators may be hydraulically activated and are attached to tubes, such as fuel lines to convey fuel. The tubes typically have a thermal growth mismatch relative to the fixed structure, and such thermal growth mismatches must be managed, without leaving the tubes hanging unsupported against an actuator force. The actuator force can stretch and cause the tubes to yield if the actuator force is not properly reacted by other components.

BRIEF DESCRIPTION

In one exemplary embodiment, a mounting bracket of a gas turbine engine includes a first mounting flange configured to connect the mounting bracket to a casing of the gas turbine engine, a second mounting flange configured to connect a component to the mounting bracket, and a bracket leg extending between the first mounting flange and the second mounting flange. The mounting bracket has a first stiffness when a load is applied in a first force direction and has a second stiffness different from the first stiffness when the load is applied in a second force direction opposite the first force direction.

Additionally or alternatively, in this or other embodiments a side flange extends from the first mounting flange. The side flange is configured to extend along a side surface of a casing boss of the casing.

Additionally or alternatively, in this or other embodiments an included angle between the first mounting flange and the side flange is less than or equal to 90 degrees.

Additionally or alternatively, in this or other embodiments an included angle between the bracket leg and the second mounting flange is between 90 degrees and 180 degrees.

In another exemplary embodiment, an actuator and casing assembly of a gas turbine engine includes an actuator configured to operate one or more components of the gas turbine engine, a casing assembly of the gas turbine engine to which the actuator is assembled, and an actuator mounting bracket to secure the actuator to the casing assembly. The actuator mounting bracket includes a first mounting flange configured to connect the actuator mounting bracket to the casing assembly, a second mounting flange configured to connect the actuator to the actuator mounting bracket, and a bracket leg extending between the first mounting flange and the second mounting flange. The actuator mounting bracket has a first stiffness when an actuator load is applied in a first force direction and has a second stiffness different from the first stiffness when the actuator load is applied in a second force direction opposite the first force direction.

Additionally or alternatively, in this or other embodiments the first mounting flange abuts a casing boss protruding from the casing assembly.

Additionally or alternatively, in this or other embodiments a side flange extends from the first mounting flange. The side flange is configured to extend along a side surface of the casing boss.

Additionally or alternatively, in this or other embodiments an included angle between the first mounting flange and the side flange is less than or equal to 90 degrees.

Additionally or alternatively, in this or other embodiments an included angle between the bracket leg and the second mounting flange is between 90 degrees and 180 degrees.

Additionally or alternatively, in this or other embodiments a first threaded fastener extends through the first mounting flange and into the casing assembly.

Additionally or alternatively, in this or other embodiments the first threaded fastener is positioned off center in the first mounting flange.

Additionally or alternatively, in this or other embodiments a second threaded fastener extends through an actuator flange of the actuator and through the second mounting flange.

Additionally or alternatively, in this or other embodiments the second threaded fastener is positioned off center in the second mounting flange.

Additionally or alternatively, in this or other embodiments the actuator is a hydraulic actuator including an actuator body, and one or more tubes supplying hydraulic fluid to the actuator body.

In yet another exemplary embodiment, a gas turbine engine includes a combustor section, a turbine section driven by products of the combustion section, a a compressor section driven by rotation of the turbine section, and an actuator and casing assembly. The actuator and casing assembly includes an actuator configured to operate one or more components of the gas turbine engine, a casing assembly of the gas turbine engine to which the actuator is assembled, and an actuator mounting bracket to secure the actuator to the casing assembly. The actuator mounting bracket includes a first mounting flange configured to connect the actuator mounting bracket to the casing assembly, a second mounting flange configured to connect the actuator to the actuator mounting bracket, and a bracket leg extending between the first mounting flange and the second mounting flange. The actuator mounting bracket has a first stiffness when an actuator load is applied in a first force direction and has a second stiffness different from the first stiffness when the actuator force is applied in a second force direction opposite the first force direction.

Additionally or alternatively, in this or other embodiments the first mounting flange abuts a casing boss protruding from the casing assembly.

Additionally or alternatively, in this or other embodiments a side flange extends from the first mounting flange. The side flange is configured to extend along a side surface of the casing boss.

Additionally or alternatively, in this or other embodiments an included angle between the first mounting flange and the side flange is less than or equal to 90 degrees.

Additionally or alternatively, in this or other embodiments an included angle between the bracket leg and the second mounting flange is between 90 degrees and 180 degrees.

Additionally or alternatively, in this or other embodiments the actuator is a hydraulic actuator including an actuator body, and one or more tubes supplying hydraulic fluid to the actuator body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
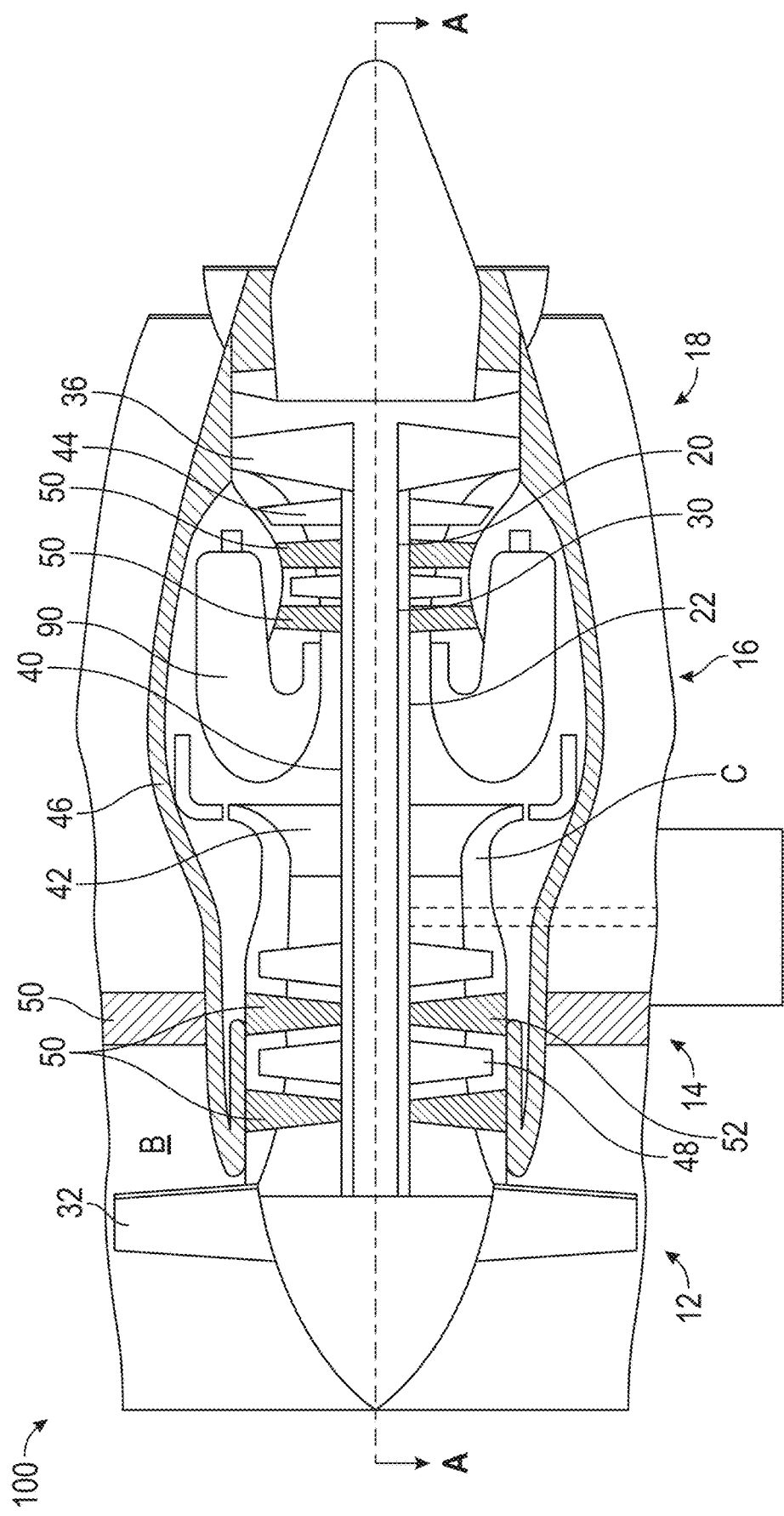
FIG. 1 is a partial cross-sectional view of an embodiment of a gas turbine engine.

FIG. 1 schematically illustrates a gas turbine engine 10. The gas turbine engine 10 is disclosed herein as a two-spool turbofan that generally incorporates a fan section 12, a compressor section 14, a combustor section 16 and a turbine section 18. Alternative engines might include other systems or features. The fan section 12 drives air along a bypass flow path B in a bypass duct, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool and turboshaft architectures.

The exemplary engine 10 generally includes a low speed spool 20 and a high speed spool 22 mounted for rotation about an engine central longitudinal axis A relative to an engine static structure 26.

The low speed spool 20 generally includes an inner shaft 30 that interconnects a fan 32, and a low pressure turbine 36. The high speed spool 22 includes an outer shaft 40 that interconnects an impeller 42 and high pressure turbine 44. A combustor 90 is arranged in exemplary gas turbine 10 between the impeller 42 and the high pressure turbine 44. The inner shaft 30 and the outer shaft 40 are concentric and rotate about the engine central longitudinal axis A which is collinear with their longitudinal axes.

The core airflow is compressed by the impeller 42, mixed and burned with fuel in the combustor 90, then expanded over the high pressure turbine 44 and low pressure turbine 36. The turbines 36, 44 rotationally drive the respective low speed spool 20 and high speed spool 22 in response to the expansion. It will be appreciated that each of the positions of the fan section 12, compressor section 14, combustor section 16, and turbine section 18, may be varied. While the structure described herein is a two-spool gas turbine engine 10, one skilled in the art will readily appreciate that the present disclosure may be similarly applied to a single spool or three or more spool gas turbine engine 10. The core flow path C is separated from the bypass flowpath B by a core casing 46 that encloses the compressor section 14, the combustor section 16 and the turbine section 18. The compressor section 14 includes two or more compressor stages, with each compressor stage including at least a compressor rotor 48. In some embodiments, one or more of the compressor rotors 48 is an impeller.

Figure 2:
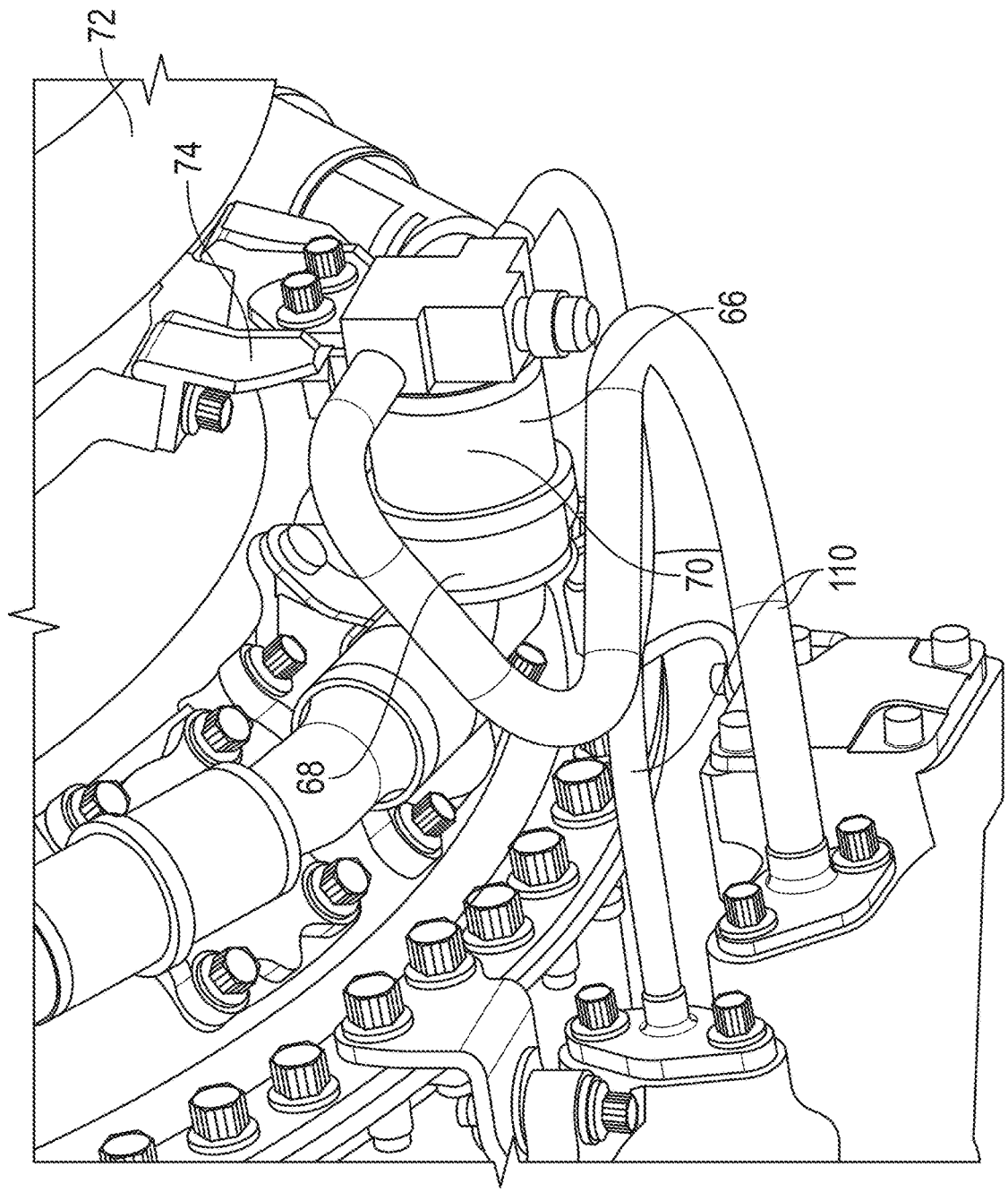
FIG. 2 is a partial cross-sectional view of an embodiment of a gas turbine engine including a support structure for an actuator and tubes.

Referring now to FIG. 2, the gas turbine engine 10 includes one or more components or systems mounted on an exterior of a case 72 of the gas turbine engine 10. For example, in the embodiment of FIG. 2, a hydraulically-driven actuator 70, such as a transfer tube, is mounted to the casing 72, with one or more tubes 110 extending therefrom. As illustrated, the actuator 70 is secured and supported at a first end 66, but is free or unsupported at a second end 68 opposite the first end 66.

Figure 3:
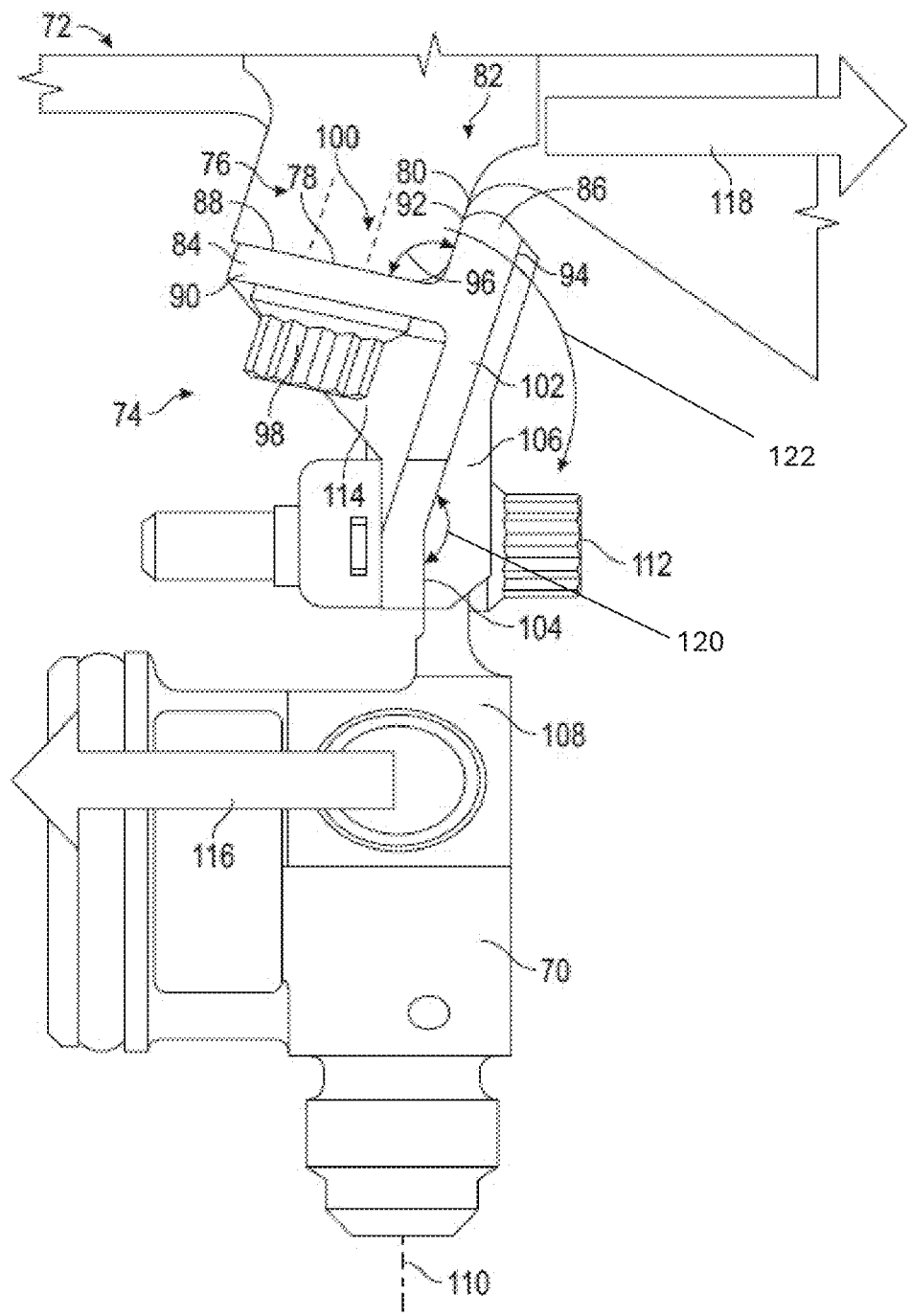
FIG. 3 is a partial cross-sectional view of an embodiment of a component mounting bracket of a gas turbine engine.

Referring now to FIG. 3, the actuator 70 is mounted to the casing 72 via an actuator bracket 74, and in some embodiments the actuator bracket 74 is secured to a casing boss 76 of the casing 72. The casing boss 76 has a mounting surface 78 and a boss side surface 80 that extends from the mounting surface 78 to a casing body 82 of the casing 72. The actuator bracket 74 includes a boss flange 84 located on the mounting surface 78 and a side flange 86 located at and extending along the boss side surface 80. More particularly, the boss flange 84 includes a boss flange front surface 88 nearest to the mounting surface 78 and a boss flange back surface 90 opposite to the boss flange front surface 88. Similarly, the side flange 86 includes a side flange front surface 92 nearest to the boss side surface 80 and a side flange back surface 94 opposite to the side flange front surface 92.

Figure 4:
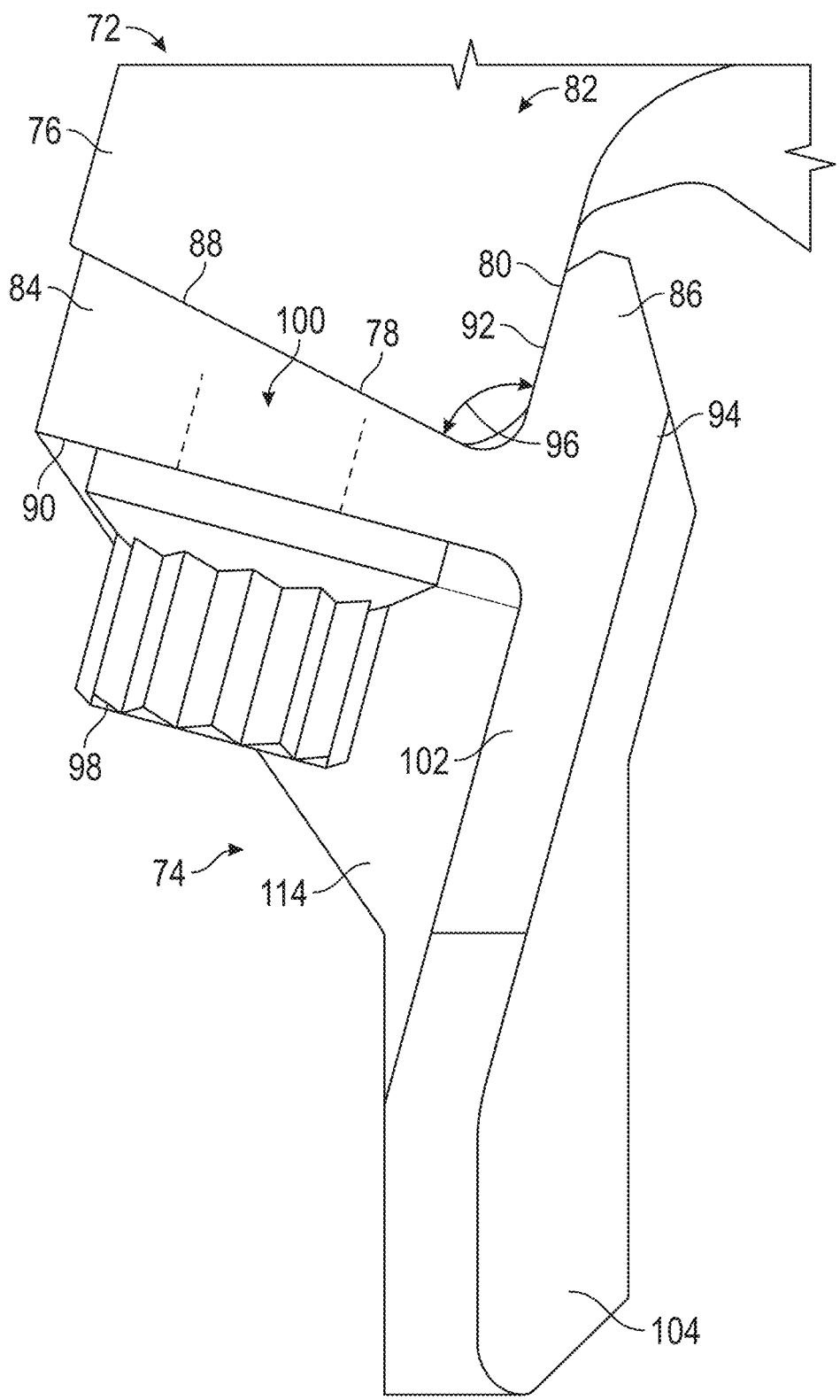
FIG. 4 is a partial cross-sectional view of another embodiment of a component mounting bracket of a gas turbine engine.

In some embodiments, such as in FIG. 3, an included angle 96 between the boss flange front surface 88 and the side flange front surface 92 is 90 degrees. In other embodiments, however, such as shown in FIG. 4, the included angle 96 is less than 90 degrees. A boss fastener 98 extends through the boss flange 84 and into the casing boss 76 via the mounting surface 78. In some embodiment the casing boss 76 includes a threaded boss opening 100 into which the boss fastener 98 is installed. In some embodiments, the boss fastener 98 is one of a screw or a bolt.

Referring again to FIG. 3, a bracket leg 102 extends away from the boss flange 84 in a direction opposite the side flange 86. In some embodiments, the bracket leg 102 extends parallel to the side flange 86. A bracket mounting flange 104 is located at a distal end of the bracket leg 102 opposite to the side flange 86. In some embodiments, an included angle 120 between the bracket leg 102 and the bracket mounting flange 104 is greater than 90 degrees and less than 180 degrees. The actuator 70 is secured to the bracket mounting flange 104 via an actuator mounting flange 106 extending from an actuator body 108. One or more actuator tubes 110 extend from the actuator body 108 to supply the actuator body 108 with hydraulic fluid. A bracket fastener 112 extends through the actuator mounting flange 106 and the bracket mounting flange 104 to secure the actuator 70 to the actuator bracket 74. In some embodiments, the bracket fastener 112 is a nut and bolt arrangement, but one skilled in the art will readily appreciate that this is merely exemplary and that other bracket fastener 112 configurations may be utilized. In some embodiments, as illustrated in FIG. 3, one or more bracket ribs 114 extend between the bracket leg 102 and the boss flange 84 to prevent movement of the bracket leg 102 toward the boss flange 84 during operation under load. The bracket ribs 114 may be sized and shaped to provide the selected stiffness of the actuator bracket 74. Further, in some embodiments the locations of the bracket fastener 112 and/or the boss fastener 98 are not centered on their respective mounting surfaces.

Under a first operating condition, the actuator 70 applies a load to the actuator bracket 74 is a first force direction 116, and the load is reacted at the casing boss 76 in a second force direction 118 opposite the first force direction 116. The configuration of the actuator bracket 74 allows the actuator 70 to pivot or rotate in a first pivot direction 122. The actuator bracket 74 is relatively compliant when the actuator load is applied in the first force direction 116, allowing slight movement of the actuator 70 in the first force direction 116.

Figure 5:
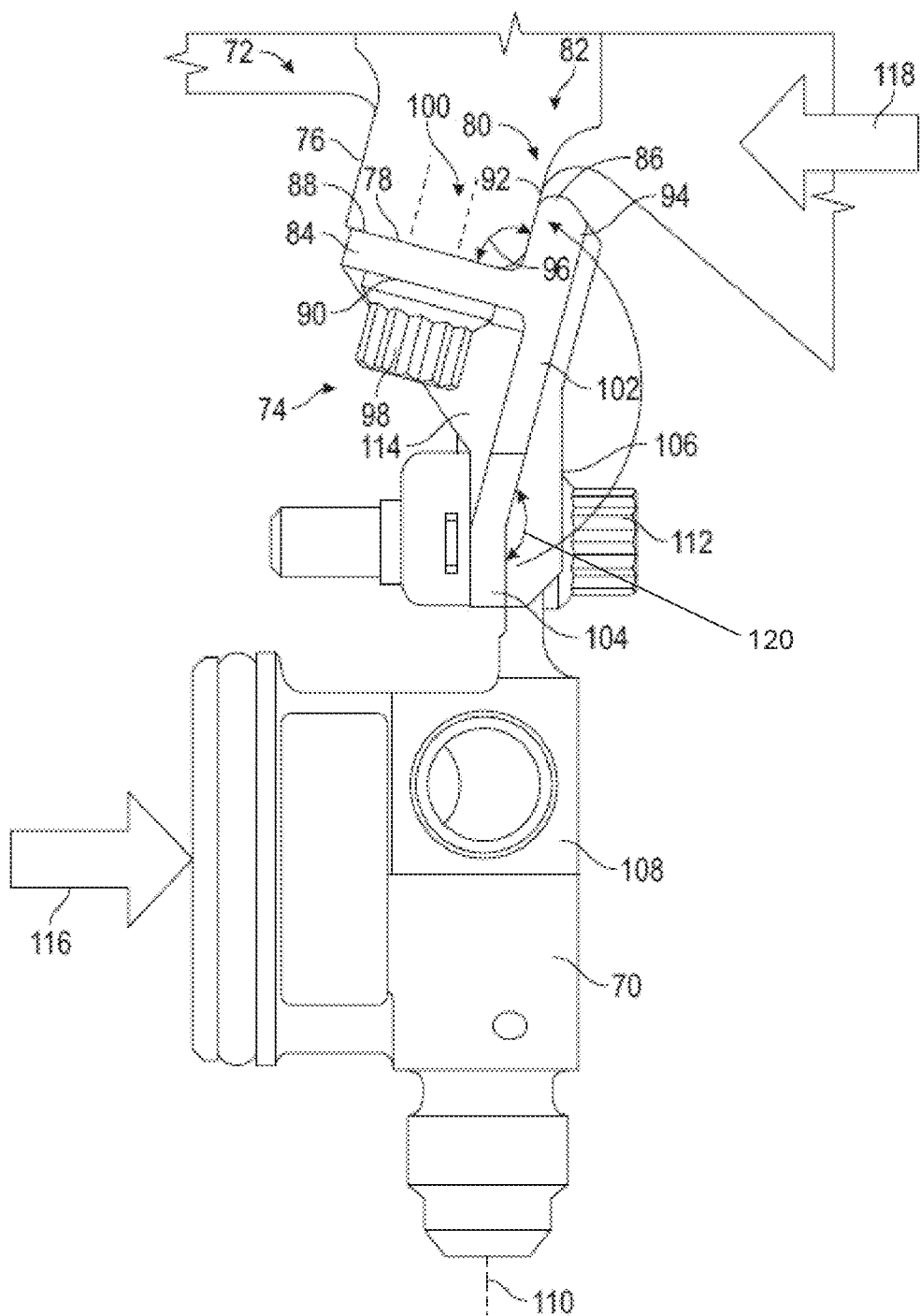
FIG. 5 is a partial cross-sectional view of yet another embodiment of a component mounting bracket of a gas turbine engine.
Figure 6:
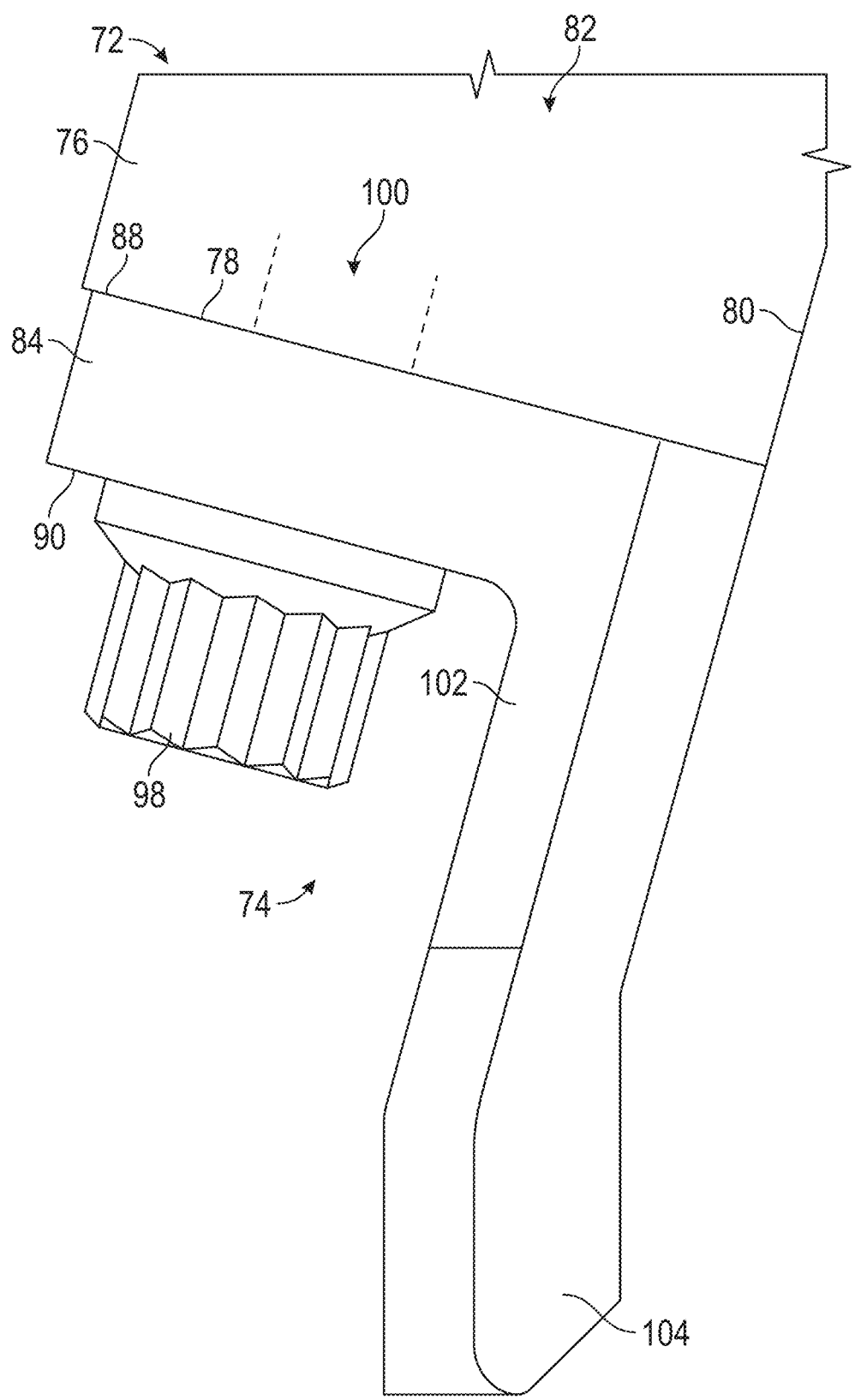
FIG. 6 is a partial cross-sectional view of still another embodiment of a component mounting bracket of a gas turbine engine.

Referring now to FIG. 5, under a second operating condition the actuator 70 applies a load to the actuator bracket 74 in the second force direction 118, and the force is reacted in the first force direction 116. When the load is applied in the second force direction 118 as shown, the side flange 86 is urged toward the boss side surface 72, which prevents movement of the actuator 70 in the first force direction 116. In another embodiment, as illustrated in FIG. 6, the side flange 86 is omitted, resulting in a different stiffness profile when the load is applied in the second force direction 118. In the embodiment of FIG. 6, the mounting surface 78 and the boss flange front surface 88 are lengthened compared to other embodiments, thus allowing for omission of the side flange 86.

The actuator bracket 74 provides improved support stiffness for the actuator load applied in the first force direction 116, such as illustrated in FIG. 3, and lower stiffness against tube stretching when the load is applied in the second force direction 118. Use of mounting fasteners not located in the center of their respective mount surfaces allows the actuator bracket 74 to bend more in one direction than in the other. The bending behavior keeps the actuator bracket 74 in the same position, springs back to the neutral position at shutdown, and prevents fretting from a sliding action between parts. The actuator bracket 74 solution is also very compact and cost efficient.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mounting bracket of a gas turbine engine, comprising:
   a first mounting flange configured to connect the mounting bracket to a casing of the gas turbine engine;
   a second mounting flange configured to connect a component to the mounting bracket; and
   a bracket leg extending between the first mounting flange and the second mounting flange;
   wherein the mounting bracket has a first stiffness when a load is applied in a first force direction and has a second stiffness different from the first stiffness when the load is applied in a second force direction opposite the first force direction;
   wherein the first mounting flange extends perpendicularly from the bracket leg;
   wherein the first mounting flange is configured to abut a casing boss protruding from the casing assembly; and
   further comprising a side flange extending from the first mounting flange, the side flange configured to extend along a side surface of the casing boss.

2. The mounting bracket of claim 1, wherein an included angle between the first mounting flange and the side flange is less than or equal to 90 degrees.

3. The mounting bracket of claim 1, wherein an included angle between the bracket leg and the second mounting flange is between 90 degrees and 180 degrees.

4. A casing and component assembly of a gas turbine engine comprising:
   a casing assembly of the gas turbine engine;
   a component assembled to the casing assembly; and
   a mounting bracket to secure the component to the casing assembly, the mounting bracket including:
      a first mounting flange configured to connect the mounting bracket to the casing assembly;
      a second mounting flange configured to connect the component to the mounting bracket; and
      a bracket leg extending between the first mounting flange and the second mounting flange;
   wherein the mounting bracket has a first stiffness when a load is applied in a first force direction and has a second stiffness different from the first stiffness when the load is applied in a second force direction opposite the first force direction;
   wherein the first mounting flange extends perpendicularly from the bracket leg;
   wherein the first mounting flange abuts a casing boss protruding from the casing assembly; and
   further comprising a side flange extending from the first mounting flange, the side flange configured to extend along a side surface of the casing boss.

5. The casing and component assembly of claim 4, wherein an included angle between the first mounting flange and the side flange is less than or equal to 90 degrees.

6. The casing and component assembly of claim 4, wherein an included angle between the bracket leg and the second mounting flange is between 90 degrees and 180 degrees.

7. The casing and component assembly of claim 4, further comprising a first threaded fastener extending through the first mounting flange and into the casing assembly.

8. The casing and component assembly of claim 7, wherein the first threaded fastener is positioned off center in the first mounting flange.

9. The casing and component casing assembly of claim 4, further comprising a second threaded fastener extending through a component flange of the component and through the second mounting flange.

10. The casing and component assembly of claim 9, wherein the second threaded fastener is positioned off center in the second mounting flange.

11. The casing and component assembly of claim 4, wherein the component is a hydraulic actuator including:
   an actuator body; and
   one or more tubes supplying hydraulic fluid to the actuator body.

12. A gas turbine engine, comprising:
   a combustor section;
   a turbine section driven by products of the combustion section;
   a compressor section driven by rotation of the turbine section; and
   a casing and component assembly including:
      a casing assembly of the gas turbine engine to which the component is assembled;
      a component assembled to the casing assembly; and
      a mounting bracket to secure the component to the casing assembly, the mounting bracket including:
         a first mounting flange configured to connect the mounting bracket to the casing assembly;
         a second mounting flange configured to connect the component to the mounting bracket; and
         a bracket leg extending between the first mounting flange and the second mounting flange;
      wherein the mounting bracket has a first stiffness when a load is applied in a first force direction and has a second stiffness different from the first stiffness when the load is applied in a second force direction opposite the first force direction;
      wherein the first mounting flange extends perpendicularly from the bracket leg;
      wherein the first mounting flange abuts a casing boss protruding from the casing assembly;
      further comprising a side flange extending from the first mounting flange, the side flange configured to extend along a side surface of the casing boss.

13. The gas turbine engine of claim 12, wherein an included angle between the first mounting flange and the side flange is less than or equal to 90 degrees.

14. The gas turbine engine of claim 12, wherein an included angle between the bracket leg and the second mounting flange is between 90 degrees and 180 degrees.

15. The gas turbine engine of claim 12, wherein the component is a hydraulic actuator including:
   an actuator body; and
   one or more tubes supplying hydraulic fluid to the actuator body.

* * * * *